United States Patent
Long

(10) Patent No.: US 8,621,955 B2
(45) Date of Patent: Jan. 7, 2014

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 238 days.

(21) Appl. No.: 12/911,917

(22) Filed: Oct. 26, 2010

(65) Prior Publication Data

US 2011/0232410 A1    Sep. 29, 2011

(30) Foreign Application Priority Data

Mar. 25, 2010   (CN) .......................... 2010 1 0132361

(51) Int. Cl.
    *B25J 17/00*    (2006.01)
(52) U.S. Cl.
    USPC .......................................... 74/490.1; 901/14
(58) Field of Classification Search
    USPC ......... 74/490.01, 490.03, 490.05; 901/14, 15, 901/28, 29
    See application file for complete search history.

(56) References Cited

U.S. PATENT DOCUMENTS

| | | | |
|---|---|---|---|
| 3,817,403 A * | 6/1974 | Glachet et al. ................. | 414/735 |
| 3,826,383 A * | 7/1974 | Richter .......................... | 414/730 |
| 3,922,930 A * | 12/1975 | Fletcher et al. ............. | 74/665 B |
| 4,030,617 A * | 6/1977 | Richter ............................. | 414/4 |
| 4,068,536 A * | 1/1978 | Stackhouse ..................... | 74/417 |
| 4,515,039 A * | 5/1985 | Nord ........................... | 74/665 C |
| 4,606,695 A * | 8/1986 | Lenz .............................. | 414/735 |
| 4,683,772 A * | 8/1987 | Colimitra ................... | 74/490.01 |
| 4,697,472 A * | 10/1987 | Hiyane ....................... | 74/490.02 |
| 4,750,858 A * | 6/1988 | Nakashima et al. .......... | 414/732 |
| 4,776,232 A * | 10/1988 | Beyer ......................... | 74/665 M |
| 5,456,132 A * | 10/1995 | Iwanaga et al. ............. | 74/490.06 |
| 5,931,047 A * | 8/1999 | Ellqvist et al. ............. | 74/490.01 |
| 5,934,148 A * | 8/1999 | Haniya et al. .............. | 74/490.06 |
| 6,263,755 B1 * | 7/2001 | Perlin ........................ | 74/490.01 |
| 6,871,563 B2 * | 3/2005 | Choset et al. .............. | 74/490.05 |
| 7,734,375 B2 * | 6/2010 | Buehler et al. ................ | 700/245 |
| 8,210,069 B2 * | 7/2012 | Chen et al. ................. | 74/490.06 |
| 8,234,949 B2 * | 8/2012 | Pan et al. ................... | 74/490.04 |
| 8,237,388 B2 * | 8/2012 | Jinno et al. .................... | 318/560 |
| 2006/0201275 A1 * | 9/2006 | Ono ............................ | 74/490.01 |
| 2006/0213307 A1 * | 9/2006 | Haga et al. ................. | 74/490.01 |
| 2009/0031842 A1 * | 2/2009 | Kawai et al. ............... | 74/490.01 |
| 2009/0145255 A1 * | 6/2009 | Ehrenleitner .............. | 74/490.01 |
| 2012/0103127 A1 * | 5/2012 | Liu ............................. | 74/490.06 |

FOREIGN PATENT DOCUMENTS

JP         53-78554         7/1978

* cited by examiner

*Primary Examiner* — David M Fenstermacher
*Assistant Examiner* — Zakaria Elahmadi
(74) *Attorney, Agent, or Firm* — Altis Law Group, Inc.

(57) ABSTRACT

A robot arm assembly includes a first robot arm and a second robot arm rotatably connected to the first. The first robot arm includes a first input shaft and a second input shaft. The second robot arm includes a sleeve and an output shaft partially received in the sleeve. The sleeve of the second robot arm is rotated relative to the first robot arm via a pair of bevel gears. The output shaft is rotated relative to the sleeve via a plurality of bevel gears which cooperatively form a polygon.

9 Claims, 5 Drawing Sheets

ROBOT ARM ASSEMBLY

BACKGROUND

1. Technical Field

This disclosure relates to robotics, and particularly, to a robot arm assembly.

2. Description of Related Art

Presently, robots are widely used in automated production settings. A robot arm grips an object such as a workpiece. A commonly used robot generally includes a plurality of individual robot arms, with every two robot arms connected by a joint structure. The joint structure usually includes a motor reducer assembled therein. The existing motor reducer occupies a large space within the joint structure and is heavy, so most of the weight is positioned or exerted on an output shaft of the motor reducer such that the integral strength of the robot arm is reduced over time. In addition, the existing robot arm assembly occupies a relatively large space and is also heavy.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the robot arm assembly. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
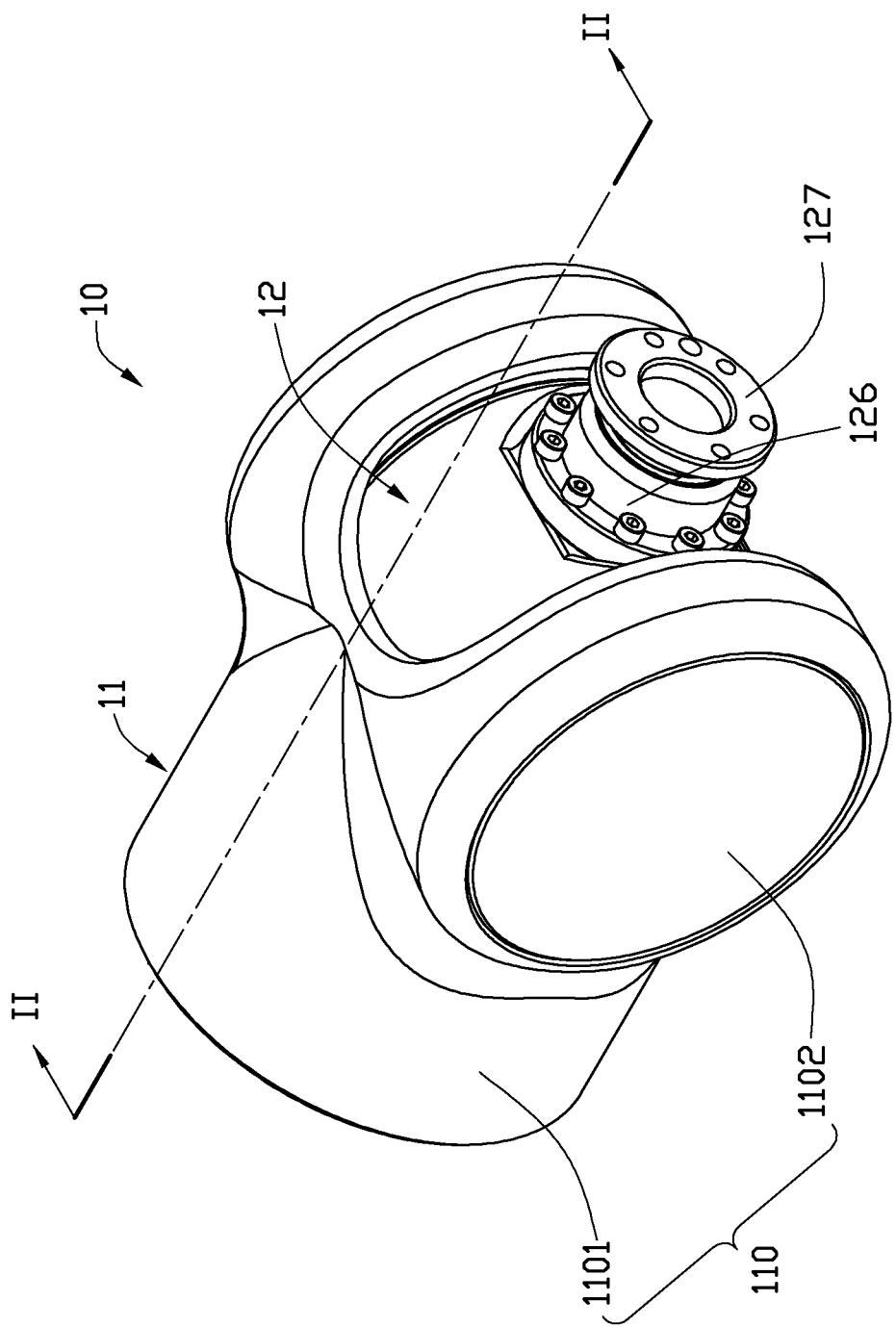
FIG. 1 is a perspective view of an embodiment of a robot arm assembly.
Figure 2:
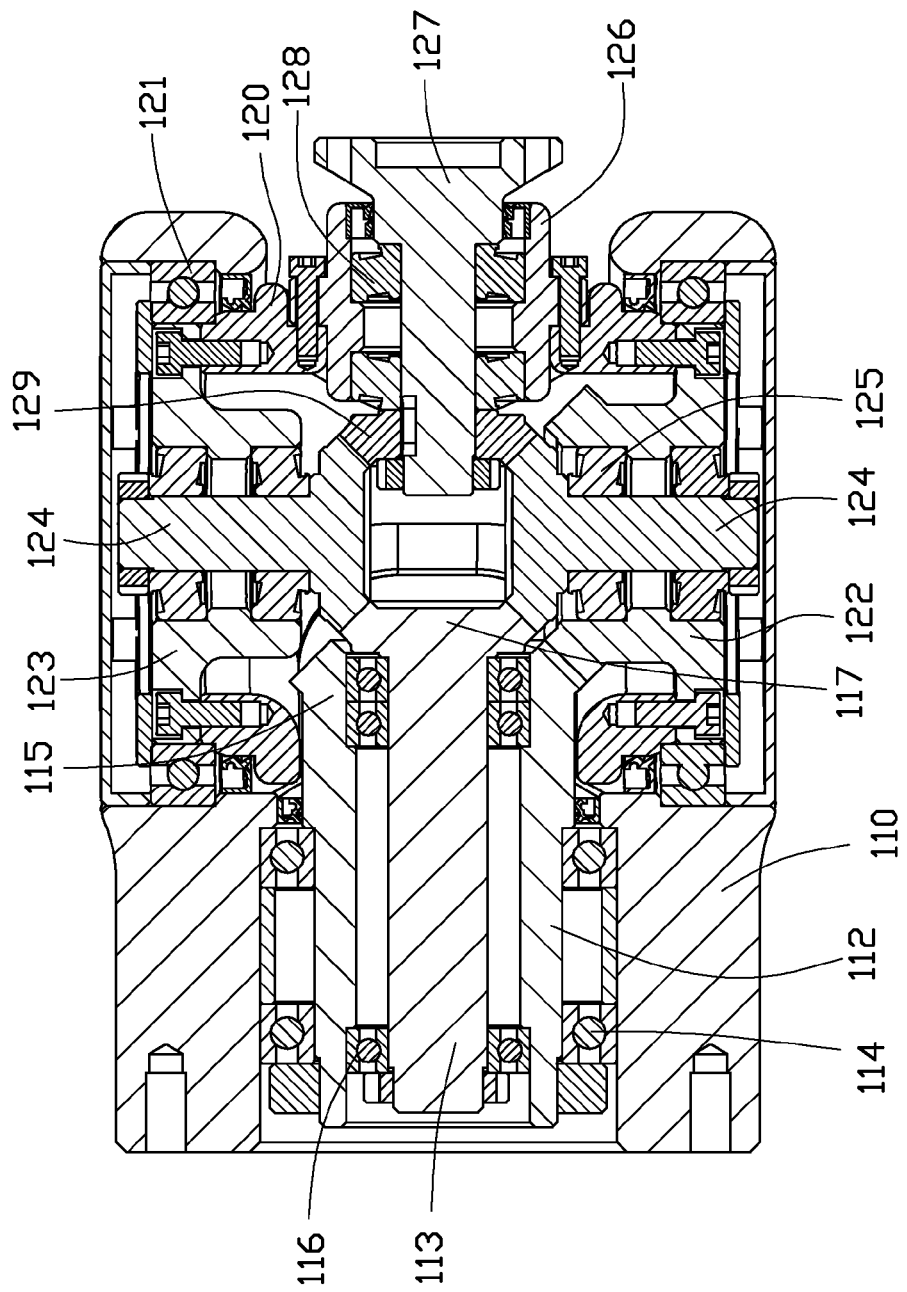
FIG. 2 is a cross-section of the robot arm assembly of FIG. 1 taken along line II-II, the robot arm assembly including a first bevel gear, a second bevel gear, a third bevel gear, a fourth bevel gear, and a fifth bevel gear.

Referring to FIGS. 1 and 2, an embodiment of a robot arm assembly 10 is shown. The robot arm assembly 10 includes a first robot arm 11 and a second robot arm 12 rotatably connected to the first robot arm 11. The first robot arm 11 includes a first axial sleeve 110, a first input shaft 112, and a second input shaft 113. The first input shaft 112 and the second input shaft 113 are assembled within the first axial sleeve 110.

The first axial sleeve 110 includes a substantially cylindrical base portion 1101 and two substantially cylindrical main portions 1102 extending outward from two opposite sides of the base portion 1101. The two main portions 1102 are positioned adjacent to one distal end of the base portion 1101. The first input shaft 112 is hollow and is rotatably assembled within the first axial sleeve 110 by a first bearing 114. A first bevel gear 115 is assembled to the distal end of the first input shaft 112. The second input shaft 113 is rotatably assembled within the first input shaft 112 by a second bearing 116. A second bevel gear 117 is assembled to the distal end of the second input shaft 113.

The second robot arm 12 includes a second axial sleeve 120 and an output shaft 127 partially assembled within the second axial sleeve 120. The second axial sleeve 120 is a substantially empty cylinder and is rotatably assembled to the first axial sleeve 110 by two third bearings 121 and located between the two main portions 1102. A third bevel gear 122 and an alignment post 123 are respectively assembled to two ends of the second axial sleeve 120 and received within the two corresponding main portions 1102 respectively. The alignment post 123 and the third bevel gear 122 are both empty. Two fourth bevel gears 124 are assembled within the corresponding alignment post 123 and the third bevel gear 122 by two fourth bearings 125 respectively.

Figure 3:
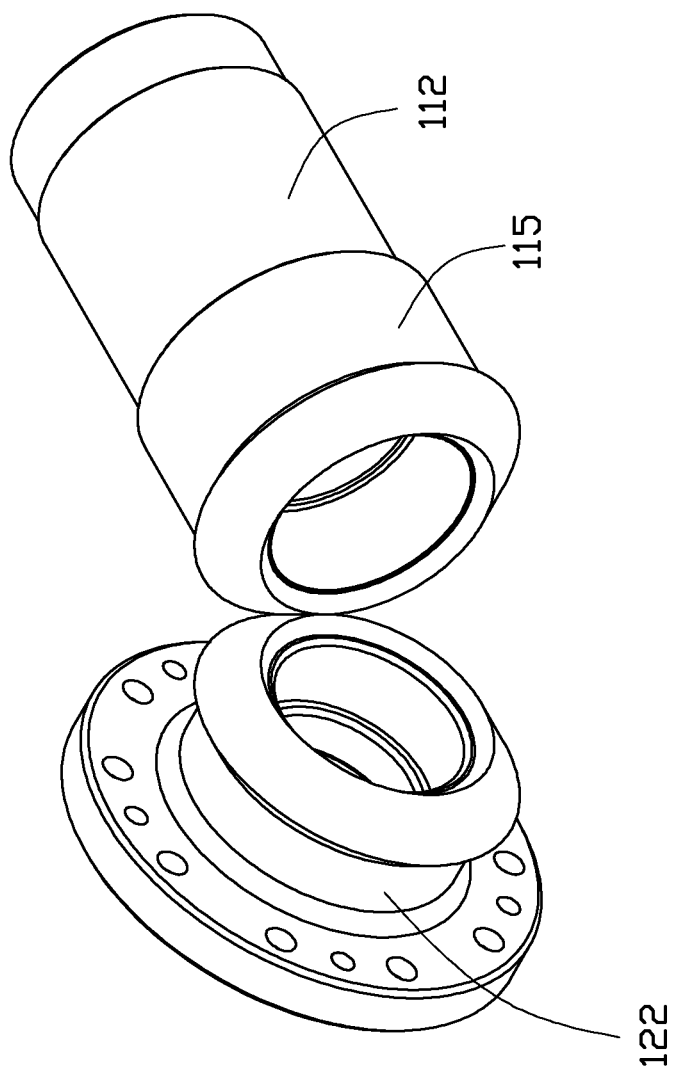
FIG. 3 is a perspective view of the first bevel gear engaging the third bevel gear of the robot arm assembly shown in FIG. 2.
Figure 4:
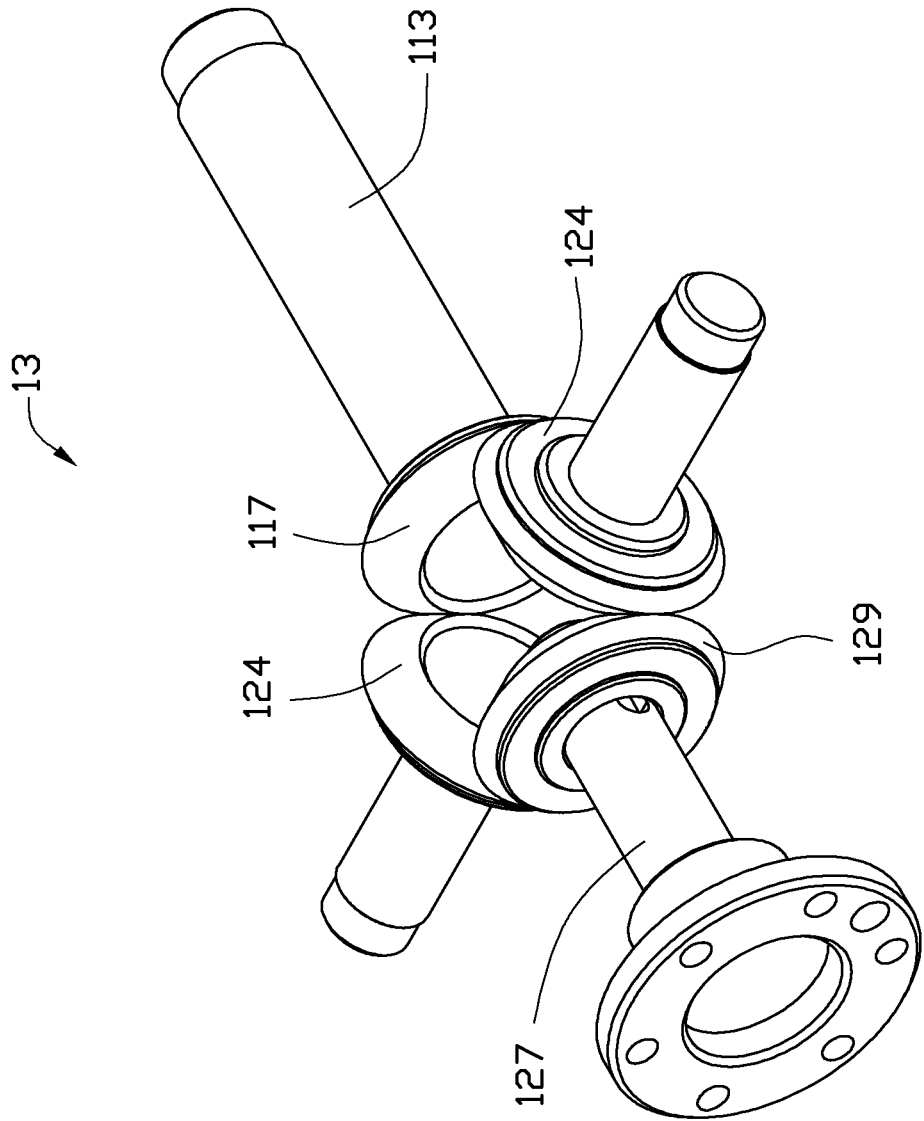
FIG. 4 is a perspective view of the second bevel gear, two fourth bevel gears, and the fifth bevel gear of the robot arm assembly shown in FIG. 2 engaging each other.

Also referring to FIGS. 3 and 4, one side of the second axial sleeve 120 defines a through hole (not labeled). The opposite other side of the second axial sleeve 120 forms an output portion 126. The first bevel gear 115 and the second bevel gear 117 both pass through the through hole of the second axial sleeve 120 and are received within the second axial sleeve 120. The first bevel gear 115 engages the third bevel gear 122 (shown in FIG. 3), such that the second axial sleeve 120 can be rotated by the first input shaft 112. The second bevel gear 117 engages the two fourth bevel gears 124. The output shaft 127 is rotatably assembled within the output portion 126 of the second axial sleeve 120 by a fifth bearing 128. One end of the output shaft 127 is exposed to the outside, and the opposite end of the output shaft 127 passes through the output portion 126 and is mounted to a fifth bevel gear 129. The fifth bevel gear 129 engages the two fourth bevel gears 124. The fifth bevel gear 129, the two fourth bevel gears 124, and the second bevel gear 117 cooperatively form a substantially symmetrical quadrangular transmission device 13 (shown in FIG. 4).

During use of the robot arm assembly 10, the first input shaft 112 is rotated by a drive (not shown), such that the first bevel gear 115 assembled at the opposite distal end of the first input shaft 112 is rotated and rotatably engages the corresponding third bevel gear 122. The second axial sleeve 120 is rotated relative to the first input shaft 112. The output shaft 127 is then moved relative to the first robot arm 11. As the second input shaft 113 is rotated, the rotation of the second input shaft 113 is transformed by the transmission device formed by the fifth bevel gear 129, the two fourth bevel gears 124, and the second bevel gear 117. The output shaft 127 is then rotated relative to the second robot arm 12 of the second axial sleeve 120.

It is understood that the transmission device 13 is not limited to the aforementioned symmetrical quadrangle structure and can alternatively be another symmetrical polygon structure, such as a symmetrical hexagon structure cooperatively formed by six bevel gears for rotating the output shaft 127 relative to the second robot arm 12.

Figure 5:
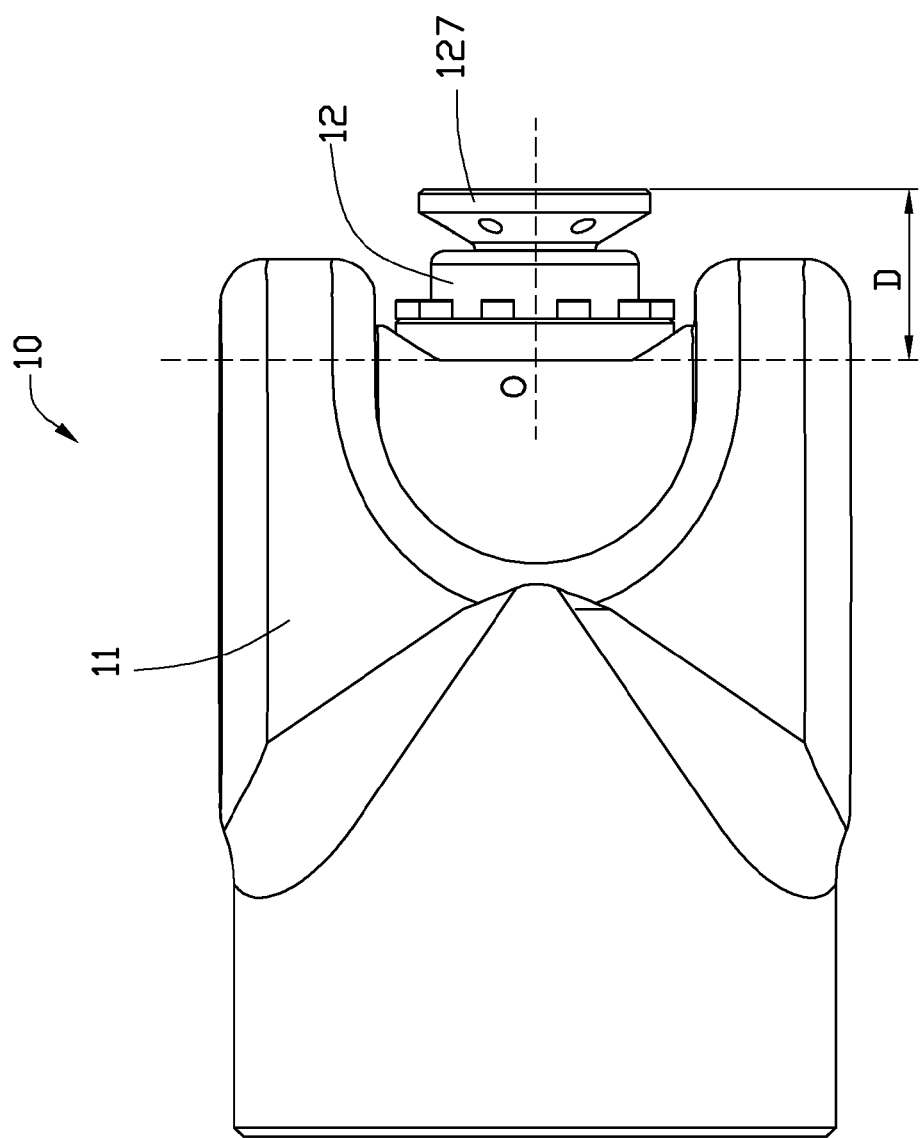
FIG. 5 is a plan view of the robot arm assembly shown in FIG. 1.

Also referring to FIG. 5, a plan view of the robot arm assembly 10 is shown. The entire weight of the transmission device 13 is equally distributed between two opposite sides of the output shaft 127, which as a result rotates more stably and enhances the overall strength of the robot arm assembly 10. As all the bevel gears of the transmission device 13 tightly engage, the transmission device 13 only occupies a small space within the second axial sleeve 120, and the distance D between the central portion O of the second robot arm 12 and the distal end of the output shaft 127 is decreased sharply. Thus, the entire volume of the robot arm assembly 10 is decreased.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A robot arm assembly, comprising:
a first robot arm comprising a first axial sleeve, a hollow first input shaft assembled within the first axial sleeve, and a second input shaft rotatably assembled within the first input shaft via a bearing;
a second robot arm rotatably connected to the first robot arm and comprising a second axial sleeve and an output shaft partially received within the second axial sleeve;
a first bevel gear and a third bevel gear respectively assembled to the first input shaft and the second axial sleeve so that the first input shaft is configured to rotate relative to the second axial sleeve; and
a transmission device assembled within the second axial sleeve so that the output shaft is configured to rotate relative to the second input shaft, wherein the transmission device has a symmetrical quadrangle structure cooperatively formed by a second bevel gear, a pair of fourth bevel gears, and a fifth bevel gear; the second bevel gear is assembled to a distal end of the second input shaft, the fifth bevel gear is assembled to a distal end of the output shaft, the pair of fourth bevel gears are opposite to each other, the second bevel gear engages with the pair of fourth bevel gears on opposite sides thereof, the fifth bevel gear engages with the pair of fourth bevel gears on opposite sides thereof, an alignment post and the third bevel gear are respectively assembled to two sides of an end of the second axial sleeve, and respectively disposed on opposite sides of a rotation axis of the second axial sleeve, the alignment post and the third bevel gear are respectively sleeved on the pair of fourth bevel gears, an axis of the alignment post is perpendicular to the rotation axis of the second axial sleeve.

2. The robot arm assembly as claimed in claim 1, wherein the first axial sleeve includes a base portion and two main portions extending outward from two opposite sides of the base portion, the two main portions are positioned adjacent to one distal end of the base portion, and the first input shaft is rotatably assembled within the base portion of the first axial sleeve by a first bearing.

3. The robot arm assembly as claimed in claim 1, wherein the second input shaft is rotatably assembled within the first input shaft by a second bearing.

4. The robot arm assembly as claimed in claim 3, wherein one side of the second axial sleeve defines a through hole, an opposite other side of the second axial sleeve forms an output portion, and the output shaft passes through the output portion with one distal end thereof exposed to the outside.

5. A robot arm assembly, comprising:
a first robot arm; and
a second robot arm rotatably connected to the first robot arm and comprising an axial sleeve and an output shaft partially received within the axial sleeve;
wherein, the axial sleeve of the second robot arm is rotatable relative to the first robot arm via a first bevel gear and a third bevel gear, the third bevel gear is assembled to the axial sleeve, and the output shaft is rotatable relative to the axial sleeve via a symmetrical quadrangle shaped transmission device cooperatively formed by a second bevel gear, a pair of fourth bevel gears, and a fifth bevel gear; the second bevel gear is rotatably assembled to the first robot arm, the fifth bevel gear is assembled to a distal end of the output shaft, the pair of fourth bevel gears are opposite to each other, the second bevel gear engages with the pair of fourth bevel gears on opposite sides thereof, the fifth bevel gear engages with the pair of fourth bevel gears on opposite sides thereof, an alignment post and the third bevel gear are respectively assembled to two sides of an end of the axial sleeve, and respectively disposed on opposite sides of a rotation axis of the second axial sleeve, the alignment post and the third bevel gear are respectively sleeved on the pair of fourth bevel gears, an axis of the alignment post is perpendicular to the rotation axis of the second axial sleeve.

6. The robot arm assembly as claimed in claim 5, wherein the first robot arm includes a hollow first input shaft rotatably assembled therein and a second input shaft rotatably assembled within the first input shaft, and the first bevel gear is assembled to one distal end of the first input shaft.

7. The robot arm assembly as claimed in claim 6, wherein the first robot arm further comprises a first axial sleeve comprising a base portion and two main portions extending outward from two opposite sides of the base portion, and the two main portions are positioned adjacent to one distal end of the base portion.

8. The robot arm assembly as claimed in claim 7, wherein the first input shaft is rotatably assembled within the base portion of the first robot arm via a first bearing, and the second input shaft is rotatably assembled within the first input shaft via a second bearing.

9. The robot arm assembly as claimed in claim 8, wherein one side of the axial sleeve of the second robot arm defines a through hole, an opposite other side of the axial sleeve forms an output portion, and the output shaft passes through the output portion with one distal end thereof exposed to the outside.

* * * * *